Oct. 5, 1965  F. S. NANNA  3,209,677
HEATING APPARATUS FOR GRILLS
Original Filed Aug. 2, 1955  2 Sheets-Sheet 1

INVENTOR.
FRANK S. NANNA
BY Horton, Davis,
Brewer and Bregman
Attys

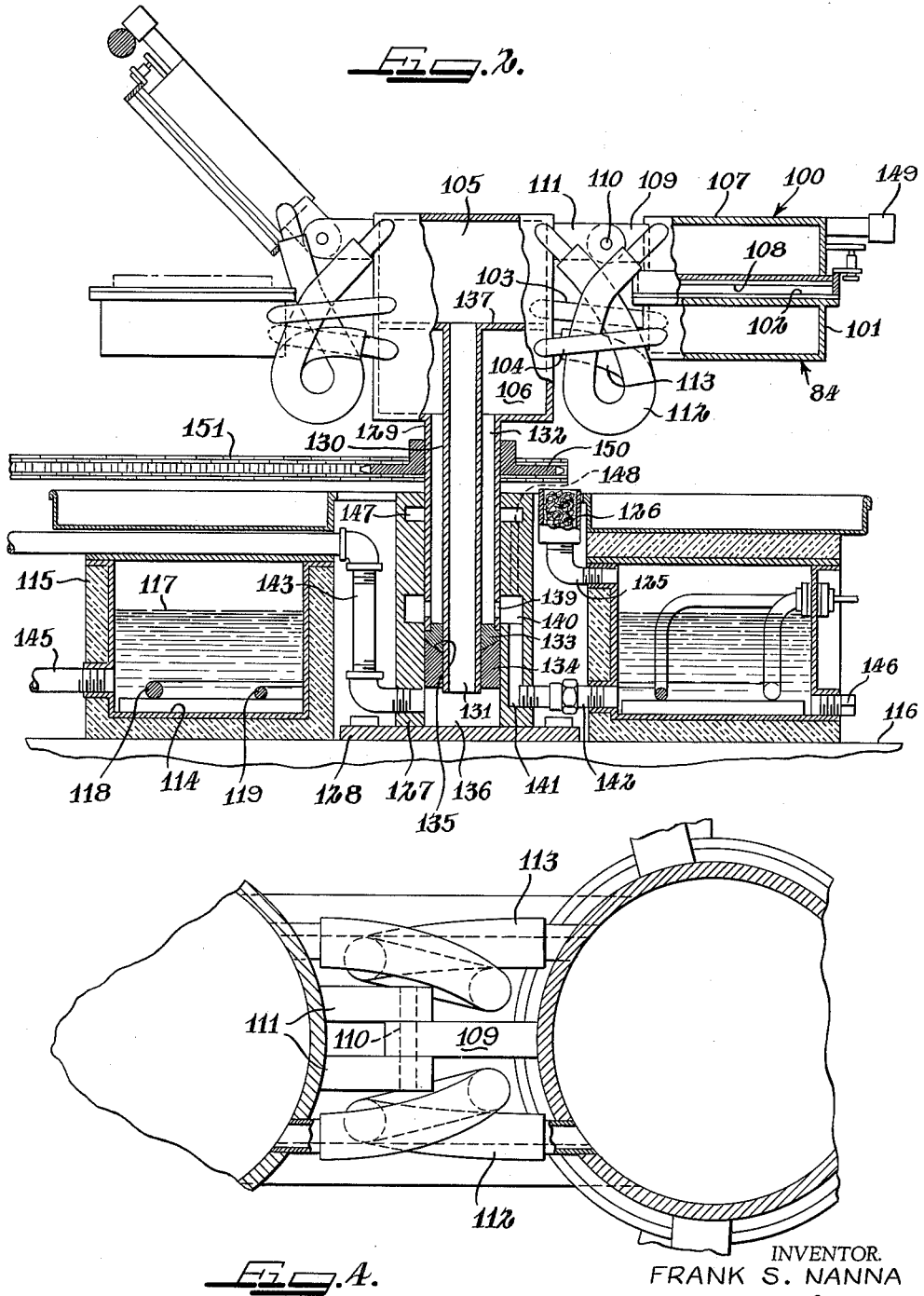

United States Patent Office 3,209,677
Patented Oct. 5, 1965

3,209,677
HEATING APPARATUS FOR GRILLS
Frank S. Nanna, 1561 Koch Lane, San Jose, Calif.
Original application Aug. 2, 1955, Ser. No. 525,960, now Patent No. 3,064,555, dated Nov. 20, 1962. Divided and this application Oct. 9, 1962, Ser. No. 229,372
2 Claims. (Cl. 99—374)

This invention relates to apparatus for heating grills such as are used for frying or broiling food. This application is a division of my co-pending application Ser. No. 525,960, filed Aug. 2, 1955, for Machine for Automatically Forming and Broiling Hamburgers, now Patent No. 3,064,555.

An object of this invention is the provision of upper and lower grills for cooking food such as ground meat or the like therebetween, said grills being heated to predetermined temperatures and all portions of the cooking surface of any grill being at substantially the same temperature to insure absolute uniformity in the cooked food.

Another object of this invention is the provision of a hot liquid such as oil, as the heating medium for food, with suitable containers, conduits and expansion chambers for heating the liquid and conducting it safely to and from the surface of the grill to be heated.

These and other objects of this invention will become apparent from the following description when taken together with the accompanying drawings in which:

FIG. 2 is an enlarged elevational view in section of a portion of the machine of FIG. 1;

FIG. 4 is an enlarged fragmentary plan view in section of the upper grills and the hose connections thereto.

Figure 1:
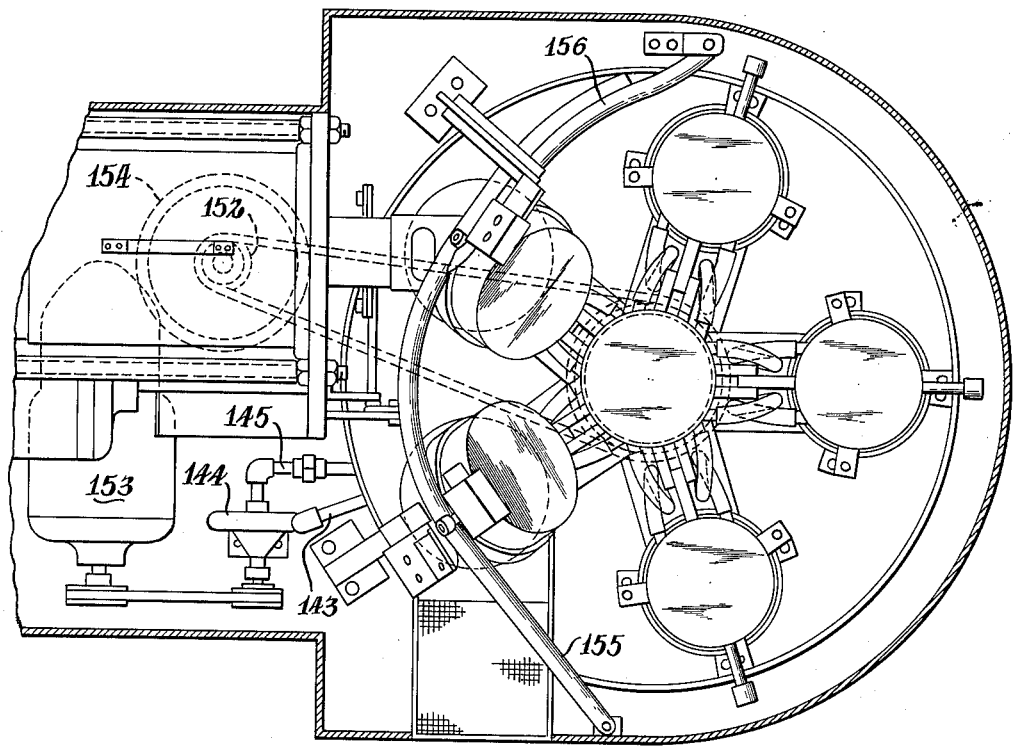
FIG. 1 is a plan view of a plurality of grills forming part of an automatic machine for continuously cooking hamburgers.

Referring now to the drawings for a detailed description of the preferred embodiment of my invention depicted therein, it may be seen that the means for cooking meat according to this invention is comprised of a lower grill 84 and an upper grill 100. The embodiment illustrated is designed to cook a plurality of hamburger patties simultaneously and hence several such pairs of grills are shown, each of which pairs is identical. To simplify the description, only one such pair will be described herein.

Each lower grill 84 is comprised of a sealed container 101 having a meat contacting surface 102 preferably made of a material to which the meat does not readily adhere either in the cooked or uncooked state. Such material may be polytetrafluoroethylene sold under the trade name of "Teflon" by E. I. du Pont de Nemours and disclosed and claimed in my co-pending application Ser. No. 480,377, filed Jan. 7, 1955, now abandoned. Access to container 101 is had by means of a pair of tubes 103 and 104 connected with centrally disposed chambers 105 and 106, respectively, said chambers being placed one above the other. In addition to providing access to container 101, tubes 103 and 104 support the lower grill from containers 105 and 106. The lower grills are disposed around containers 105 and 106 at equiangular intervals, the number of such grills being determined to a large extent by the intended capacity of the machine.

The upper grill 100 is comprised of a container 107 which may be identical in size and shape with container 101 but is disposed in inverted relation thereto so that its cooking surface 108 is on the bottom of the container and is adapted to contact the upper surface of the meat to be cooked. Container 107 is supported from container 105 by an arm 109 hingedly secured at 110 between spaced arms 111 extending from the sides of container 105 (see FIG. 4). This hinged construction allows container 107 to be raised with respect to container 101 in the manner shown with respect to the upper grill on the left side of FIG. 2. Communication to the interior of container 107 is established through a flexible hose 112 and communication between containers 107 and 106 is established through a flexible hose 113.

Figure 3:
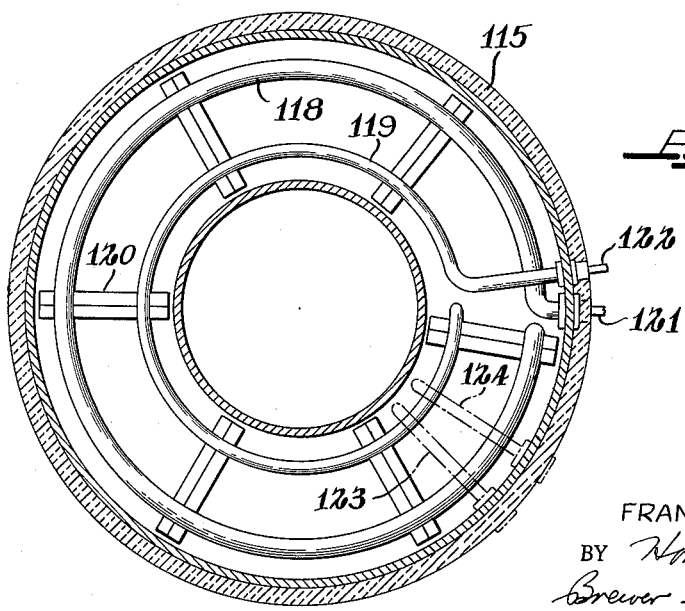
FIG. 3 is a plan view in section on a reduced scale of the lower portion of the machine of FIG. 2 taken along the line 3—3 thereof.

The heating medium for grills 84 and 100 is hot oil stored in an annular container 114 concentrically disposed with respect to containers 105 and 106. Said container 114 is covered on all sides by an adequate thickness of insulating material 115 to minimize the heat loss through the walls thereof, and the whole is supported from a counter 116 or other suitable base. The oil 117 in container 114 is heated by circular heating elements 118 and 119 (FIGS. 2 and 3) supported in spaced relation with respect to the bottom of container 114 by a plurality of spoke-like, triangular cross-sectioned bars 120 of metal or other heat resistant material. Suitable external terminals 121 and 122 are provided for heating elements 118 and 119, respectively, by which said heating elements can be reached and connected to exterior controls.

Two thermostats, 123 and 124, are inserted into container 114 at points remote from heating units 118 and 119 by which the operation of the heating units may be controlled. Thermostat 123 controls unit 118 and thermostat 124 controls unit 119. Appropriate individual switches (not shown) are provided for each unit so that either or both units may be made operative. Units 118 and 119 are of different capacities to provide different temperatures for the heating oil.

A vent pipe 125 extends inwardly from the upper regions of container 114 and terminates in an open chamber 126 filled with steel wool or the like. Pipe 125 serves as an outlet for vapors which may accumulate in container 114 and also to relieve any build-up of pressure therein. It is understood, of course, that the interior of container 114 is at atmospheric pressure and that the total quantity of oil in the system is never permitted to exceed the total volumetric capacity of container 114, so that at no time is there any danger of the hot oil escaping through vent pipe 125 and open chamber 126. The steel wool functions as a filter to prevent entry of foreign matter into the oil. Due to the high temperature of the oil and the surrounding apparatus, steel wool has been found to be most satisfactory for this purpose since it can withstand relatively high temperatures without substantial deterioration.

In the open center of annular container 114 is disposed a vertical bearing 127 having a base flange 128 by which it is securely fastened to counter or base 116. Within bearing 127 are arranged concentrically an outer tube 129 and an inner tube 130 defining a central passage 131 and an annular concentric passage 132. A tapered plug 133 at the lower end of tube 129 serves to close off the annular passage 132 and serves also as a support for outer tube 129 and the parts secured thereto, including containers 105 and 106, the pairs of lower and upper grills 84 and 100, respectively, and the pivoted supports, pipes and tubes connected thereto. A thrust bearing 134 is secured to the interior of bearing 127 and is formed with a tapered seat 135 upon which tapered plug 133 may bear. Inner tube 130 extends through thrust bearing 134 and establishes communication from the interior of the tube to a space 136 defined at the lower end of bearing 127 by base flange 128 and the bottom surface of thrust flange 134.

Inner tube 130 extends upwardly into an opening in a partition 137 separating containers 105 and 106. Outer tube 129 terminates in an appropriate opening in the bottom wall 138 of container 106. A series of openings 139 in the lower part of outer tube 129 and aligned with an internal peripheral groove 140 in bearing 127 establishes communication between annular space 132 and said groove 140, and a vertical passage 141 is connected by suitable pipes and couplings, designated generally by the reference character 142, to the lower interior regions of annular container 114. Suitable piping 143 connects space 136 with the outlet of a centrifugal pump 144 (FIG. 1) driven by an electric motor 153, and piping 145 connects the interior of container 114 with the inlet of pump 144.

It may be apparent from the description thus far given that the heating oil is circulated throughout the various chambers and grills by pump 144 in the manner indicated by the arrows. Thus oil is drawn from container 114 through pipe 145 and is then pressurized by pump 144 and forced thereby through pipe 143 to space 136. It leaves space 136 through inner passage 131 and enters container 105 from which it is led by flexible hose 112 to the upper grills 100 and by pipes 103 to lower grills 84. It is then forced from upper grill 100 through flexible hose 113 and from lower grill 84 through pipes 104 to container 106 from which it then flows through the annular passage 132 and openings 139 into annular space 140 and then back into container 114 through vertical passage 141 and pipes and coupling 142. The seat 135 formed on bearing 134 serves as an end face seal to prevent communication between the inlet and exhaust chambers 136 and 140, respectively. Because of the flexible nature of the hose 112 and 113, the circulation of the oil is not interrupted or materially altered by the position of upper grill 100 relative to lower grill 84 and hence said upper grill 100 will continue to be heated even when it is in the raised position shown to the left in FIG. 2.

Provision is made for draining container 114 through a drain plug 146. Any oil which may escape from between the interior of bearing 127 and the exterior of outer tube 129 is collected in an inner peripheral groove 147 and is then led back to groove 140 by axially disposed passages 148.

The electrically heated oil provides absolutely uniform heat over the meat-contacting surfaces of the grills and hence results in uniform cooking of the meat. It also provides a single heating system for a number of grills which reduces the possibility of breakdowns and simplifies maintenance and repairs.

Under normal operating conditions, upper grill 100 will rest upon the meat disposed on the upper surface of lower grill 84 so that the entire weight of the upper grill, including the weight of the heating oil, rests upon the meat to cook and shape the meat evenly.

Outer tube 129 is rotated from a sprocket 150 secured thereto between bearing 127 and container 106, and connected by a chain 151 to a drive sprocket 152 (FIG. 1) driven from a motor 154 through a suitable speed reducing mechanism (not shown). It is contemplated that rotation of tube 129 will rotate the grills and cause the upper grill to be automatically raised and lowered with respect to the lower grill by contact between rollers 149 in said upper grills and curved tracks 155 and 156 (FIG. 1) as described in greater detail in my aforementioned co-pending application Ser. No. 525,960.

I claim:

1. In combination in an apparatus for cooking food in a plastic state, a plurality of grills, each grill comprising a closed container, a pair of superposed central containers, said grills being arranged in a circle around and supported by said central containers, a pair of pipes connected to each grill, one pipe of each pair being connected to one central container and the other of each pair being connected to the other central container, a reservoir disposed below said central containers, liquid in said reservoir, vertically disposed pipe means connecting each central chamber with and supporting said central chambers above the reservoir, means for heating the liquid in the reservoir, and pump means therefor connected to one of the pipe means connecting the reservoir with the central chamber for circulating the heated liquid through the grills to heat said grills, the pipes connecting the central chambers with the reservoir being telescoped one in the other, the inner pipe extending below the outer pipe, bearing means extending radially from the inner part to the end of the outer part, end thrust bearing means co-operating with the means extending radially from the inner pipe and supporting the outer telescoped pipe for rotation about its axis, and means for rotating the said telescoped pipes.

2. In combination in an apparatus for cooking food in a plastic state, a plurality of grills, each grill comprising a closed container, a pair of superposed central containers, said grills being arranged in a circle around and supported by said central containers, a pair of pipes connected to each grill, one pipe of each pair being connected to one central container and the other of each pair being connected to the other central container, a reservoir disposed below said central containers, liquid in said reservoir, vertically disposed pipe means connecting each central chamber with and supporting said central chambers above the reservoir, means for heating the liquid in the reservoir, and pump means therefor connected to one of the pipe means connecting the reservoir with a central chamber for circulating the heated liquid through the grills to heat said grills, said reservoir being annular in form and said pipe means connecting the reservoir with each central container including telescoped pipes, bearing means in a central space formed by the annular reservoir for supporting the outer telescoped pipe for rotation about the axis of the said outer telescoped pipe, means for rotating the outer telescoped pipe, means for establishing a fluid connection between the rotating telescoped pipes and the reservoir, said last-mentioned means including an exhaust conduit communicating with the exterior of the outer pipe and an inlet conduit communicating with the end of the inner pipe, and said bearing means preventing communication between said inlet and outlet conduits.

References Cited by the Examiner

UNITED STATES PATENTS

| 1,900,456 | 3/33 | Mead | 18—20 |
| 2,515,093 | 7/50 | Mills | 18—20 X |
| 2,575,068 | 11/51 | Nanna | 99—353 |
| 2,579,399 | 12/51 | Ruekberg | 18—20 X |
| 2,641,797 | 6/53 | Waltman | 18—20 X |
| 2,672,652 | 3/54 | Howe et al. | 18—20 |

ROBERT E. PULFREY, *Primary Examiner.*

LAWRENCE CHARLES, *Examiner.*